(12) United States Patent
Smith (10) Patent No.: US 9,747,700 B2
(45) Date of Patent: Aug. 29, 2017

(54) MEDICAL IMAGE PROCESSING METHOD

(71) Applicant: University of Mississippi Medical Center, Jackson, MS (US)

(72) Inventor: Andrew Smith, Ridgeland, MS (US)

(73) Assignee: University of Mississippi Medical Center, Jackson, MS (US)

( * ) Notice: Subject to any disclaimer, the term of this patent is extended or adjusted under 35 U.S.C. 154(b) by 11 days.

(21) Appl. No.: 14/897,610

(22) PCT Filed: Jun. 10, 2014

(86) PCT No.: PCT/US2014/041793
§ 371 (c)(1),
(2) Date: Dec. 10, 2015

(87) PCT Pub. No.: WO2014/201052
PCT Pub. Date: Dec. 18, 2014

(65) Prior Publication Data
US 2016/0110890 A1   Apr. 21, 2016

Related U.S. Application Data (60) Provisional application No. 61/833,416, filed on Jun. 10, 2013.

(51) Int. Cl.
*G06K 9/00* (2006.01)
*G06T 11/00* (2006.01)
(Continued)

(52) U.S. Cl.
CPC ............ *G06T 11/001* (2013.01); *G06T 5/002* (2013.01); *G06T 7/0012* (2013.01);
(Continued)

(58) Field of Classification Search
CPC .............. G06K 9/00; G06T 5/00; G06T 11/00
(Continued)

(56) References Cited

U.S. PATENT DOCUMENTS

| 6,993,171 B1* | 1/2006 | Choi ................... G06T 11/001 345/597 |
| 8,625,930 B2* | 1/2014 | Tatke .................. G02B 21/367 382/128 |

(Continued)

FOREIGN PATENT DOCUMENTS

EP       2290611 A1    3/2011

*Primary Examiner* — Abolfazl Tabatabai
(74) *Attorney, Agent, or Firm* — Stites & Harbison PLLC; Joseph P. Morris; Richard S. Myers, Jr.

(57) ABSTRACT

The present disclosure provides methods for colorizing and/or standardizing a medical image, comprising, for example, the steps of (i) receiving, in an image processing unit, digital image data obtained by an image capture device, wherein the digital image data includes a medical image; (ii) analyzing the data with the image processing unit to identify a region of interest; (iii) segmenting said region of interest; (iv) obtaining a measure of the pixel intensities in the segmented region of interest; (v) selecting an optimized color spectrum from a plurality of color spectra using the result of the measure of the pixel intensities in the segmented region of interest; (vi) colorizing the digital image data by mapping the selected color spectrum to the region of interest; and (vii) displaying the colorized medical image.

20 Claims, 8 Drawing Sheets

(51) Int. Cl.
　　　*G06T 5/00*　　　　(2006.01)
　　　*G06T 7/00*　　　　(2017.01)
　　　*A61B 6/00*　　　　(2006.01)

(52) U.S. Cl.
　　　CPC ............... *G06T 2207/10072* (2013.01); *G06T 2207/20182* (2013.01); *G06T 2210/41* (2013.01)

(58) Field of Classification Search
　　　USPC ............ 382/128–134; 378/4, 8, 21–27, 901; 600/407, 410, 411, 425, 438
　　　See application file for complete search history.

(56) References Cited

U.S. PATENT DOCUMENTS

| | | |
|---|---|---|
| 2009/0096807 A1 | 4/2009 | Silverstein et al. |
| 2010/0268223 A1 | 10/2010 | Coe et al. |
| 2011/0228970 A1 | 9/2011 | Kajihara et al. |
| 2012/0019548 A1 | 1/2012 | Zhu et al. |
| 2012/0093399 A1 | 4/2012 | Paik et al. |
| 2012/0230566 A1 | 9/2012 | Dean et al. |
| 2015/0148658 A1 | 5/2015 | Smith |

\* cited by examiner

MEDICAL IMAGE PROCESSING METHOD

RELATED APPLICATIONS

This application claims priority from International Patent Application No. PCT/US2014/041793, filed Jun. 10, 2014, which claims priority from U.S. Provisional Application Ser. No. 61/833,416, filed Jun. 10, 2013, the entire disclosures of which are incorporated herein by this reference.

TECHNICAL FIELD

The present disclosure relates to systems and/or methods for medical image processing.

INTRODUCTION

Cross sectional digital medical images include computed tomography (CT) images, magnetic resonance images (MRI), ultrasound images, positron emission tomography (PET) images, single-photon emission computed tomography (SPECT), or fusion images from any of the above cross sectional digital medical images (e.g. PET CT or PET MRI). Cross sectional digital medical images are used to visualize and detect normal and pathologic findings and are typically displayed and viewed in grayscale on a display screen.

Each pixel on a cross sectional digital medical image corresponds to a volume, called a voxel, and the intensity of each respective pixel relates to the intensity of the signal obtained by the imaging system. The pixels have a broad range of intensities in cross sectional digital medical images, often with thousands of different intensity levels, sometimes including both positive and negative values.

Many of the pixel intensity levels are indistinguishable because the human eye cannot differentiate between the several thousand shades of gray that are assigned to the various pixel intensity levels. Accordingly, image windowing is used to enhance visualization and detection of pathologic findings. Windowing is a method for displaying a narrowed range of pixel intensities, and it is frequently used to improve visualization or detection of a particular portion of an image.

Indeed, many clinically-relevant imaging findings are only visible or detectable if viewed on narrowed windows. For example, the subtle attenuation changes from acute ischemic strokes are often only visible on nonenhanced head CT images when narrowed "stroke windows" are used to view the image, rather than broader routine "brain windows". This is also true for a number of other pathologic entities, including tumors, which may have subtle signal intensity differences that are only visible and/or detectable with narrowed viewing windows. For many pathologic entities, manual windowing to enhance visualization and detection of imaging findings is necessary using current technology.

The need to manually window cross sectional digital medical images stems from several issues. Most forms of cross sectional digital medical images (e.g. MRI, ultrasound and SPECT) do not have standardized measurement units, so preset windowing is not possible. CT images are an exception, as they have standardized pixel intensity units called Hounsfield Units (HU). Hounsfield units are related to the X-ray attenuation of the imaged substance and are generally related to the density of normal bodily tissues or to the amount of administered contrast. For example, water has mean attenuation between 0 and +20 HU, and intravenous contrast can increase the attenuation of tissue by several hundred HUs.

All cross sectional digital medical images, including CT images, are subject to variability of pixel intensities across a patient population. For example, the brain and intracranial contents will have variable attenuation values (pixel intensities) on nonenhanced CT images across a population of patients. The variability in brain attenuation between different patients is most evident in clinical practice when evaluating for an acute stroke on narrowed stroke windows. Often the center of the narrowed stroke window needs to be manually adjusted upward or downward, due to variability in pixel intensity units between different patients, in order to improve visualization and/or to allow for detection of stroke.

Part of the variability in pixel intensities across a patient population is due to true differences in the density of different brains from different patients, but other factors also contribute to variability in pixel intensities. For example, variability in pixel intensities is often caused by differences in imaging protocols, scanner technology, scanner calibration, patient centering, artifacts, specific scan parameters, object or patient size, patient motion, image noise, etc. Furthermore, differences in the dose, injection rate, and timing of contrast agents or radionuclides contribute to significant variability in pixel intensities on cross sectional digital medical images. Moreover, the variability in pixel intensities across a patient population can contribute to reduced visualization and detection of normal and pathologic findings on cross sectional digital medical images.

While the use of narrowed window settings is essential for diagnosis of many conditions, narrowed window settings may also introduce problems. Image noise is much more apparent on narrowed window settings and can interfere with detection of normal and pathologic findings, particularly in obese patients where reduced signal and increased image noise are more common. Accordingly, there is a need in the art for improved medical image processing methods.

BRIEF SUMMARY

This summary describes several embodiments of the presently-disclosed subject matter, and in many cases lists variations and permutations of these embodiments. This summary is merely exemplary of the numerous and varied embodiments. Mention of one or more representative features of a given embodiment is likewise exemplary. Such an embodiment can typically exist with or without the feature(s) mentioned; likewise, those features can be applied to other embodiments of the presently-disclosed subject matter, whether listed in this summary or not. To avoid excessive repetition, this summary does not list or suggest all possible combinations of features.

The present disclosure provides, in certain embodiments, a method of colorizing a medical image in a standardized fashion. The method may comprise the steps of: (i) receiving, in an image processing unit, digital image data obtained by a digital image capture device, wherein the digital image data comprises at least one image; (ii) analyzing the digital image data with the image processing unit to identify a region of interest of an image represented by the digital image data; (iii) obtaining at least one pixel intensity value of at least one pixel contained in the region of interest; (iv) establishing at least one color spectrum, said color spectrum comprising at least one color; (v) relating the at least one pixel value to the at least one color of the color spectrum; (vi) colorizing the at least one pixel with the related at least one color of the color spectrum; and (vii) producing a colorized medical image; and/or (viii) displaying the colorized medical image.

In some embodiments, the digital image data is processed with the image processing unit, and the processing step may comprise applying at least one of a noise reduction filter and a smoothing algorithm. Moreover, the smoothing algorithm comprises a Gaussian smoothing algorithm in certain embodiments. And in some embodiments, the color spectrum is saved in a bank and/or a data storage area.

Furthermore, in certain embodiments, the digital image data comprises at least one of a computed tomography image, a magnetic resonance image, an ultrasound image, a positron emission tomography image, a single-photon emission computed tomography image, or a fusion image of two or more digital images. Also, in some embodiments, the present disclosure provides that the image is a cross-sectional image of a portion of a body of a patient.

Additionally, the methods of the present disclosure may comprise a step of analyzing the digital image data, including determining at least one statistical measure of the digital image data. The statistical measure may be, for example, an arithmetic mean of the at least one pixel intensity value of at least one pixel in the region of interest. Also, in some embodiments, the statistical measurement may be restricted to a range of pixel intensities, not including all possible pixel intensities.

In other embodiments, the present disclosure provides a method of colorizing a medical image, comprising: (i) receiving, in an image processing unit, digital image data obtained by a digital image capture device, wherein the digital image data comprises at least one medical image; (ii) analyzing the digital image data with the image processing unit to identify a region of interest of the medical image represented by the digital image data; (iii) obtaining a first pixel value for each of at least two pixels contained in the region of interest; (iv) defining a second pixel value as the arithmetic mean of the first pixel values; (v) providing at least one color spectrum, the color spectrum comprising at least one color and relating the at least one color to at least one pixel value; (vi) selecting a color spectrum comprising at least one pixel value corresponding to the second pixel value; and (vii) colorizing the region of interest with the selected color spectrum.

And in certain embodiments, the method further includes (i) producing at least one colorized medical image; (ii) displaying the at least one colorized medical image; (iii) processing the digital image data with the image processing unit; (iv) applying at least one of a noise reduction filter and a smoothing algorithm, such as a Gaussian smoothing algorithm, to the digital image data and/or only to a region of interest; (v) providing a plurality of color spectra; and/or (vi) storing a plurality of color spectra in a bank and/or a data storage unit and/or a data storage area.

In certain embodiments, the medical image of the present disclosure is a cross-sectional image of a portion of a body of a patient, and/or the medical image may include a cross sectional image of a portion of the body. In some embodiments, the medical image comprises an image of at least one of a head, a spine, a liver, a kidney and a tumor. And in some embodiments, the medical image is obtained by a digital image capture device comprising at least one of a computed tomography (CT) scanner, a magnetic resonance imaging (MRI) scanner, an ultrasound transducer, a positron emission tomography (PET) scanner, and a single photon emission computed tomography (SPECT) scanner.

In still other embodiments, the present disclosure provides a method of colorizing a medical image, comprising: (i) receiving, in an image processing unit, digital image data obtained by a digital image capture device, wherein the digital image data comprises at least one medical image; (ii) analyzing the digital image data with the image processing unit to identify a region of interest in the medical image represented by the digital image data, wherein the region of interest comprises at least one pixel; (iii) segmenting said region of interest from the digital image data to form at least a first image segment and a second image segment, wherein the first image segment comprises the region of interest; (iv) measuring at least one pixel intensity value for at least one pixel in the first image segment to obtain a at least one measurement; (v) using the at least one measurement to calculate a statistical value; (vi) providing a plurality of color spectra, wherein each color spectrum comprises at least one color and relates the at least one color to at least one color value; (vii) selecting a color spectrum from the plurality of color spectra, wherein the selected color spectrum comprises at least one color value that corresponds to the calculated statistical value; (viii) mapping the selected color spectrum to the region of interest by applying at least one color of the color spectrum to at least one pixel having a pixel intensity value corresponding to the related color value of the color spectrum; (ix) producing at least one colorized medical image; and/or (x) displaying the at least one colorized medical image.

In some embodiments, the methods of the present disclosure further comprise processing the digital image data with the image processing unit, for example by applying at least one of a noise reduction filter and a smoothing algorithm, such as a Gaussian smoothing algorithm, to a region of interest. And in certain embodiments, the calculated statistical value comprises an arithmetic mean. Meanwhile, in some embodiments, the color spectrum comprises at least two colors. Further, in some embodiments, the methods of the present disclosure include a step of storing the plurality of color spectra in at least one of a bank and a data storage unit. In certain embodiments, the digital image data comprises medical images of/from a plurality of patients.

BRIEF DESCRIPTION OF THE DRAWINGS

FIG. 11 includes the colorized and standardized CT images, IV, V and VI, which correspond to the three grayscale images from FIG. 10, I, II, and III, respectively. As shown in FIG. 10 and/or FIG. 11, the patients have different bone densities. This difference is not particularly evident on the grayscale images but is easier to visualize and/or detect on the standardized and colorized images. In FIG. 11, red corresponds to osteoporosis (IV), blue corresponds to low bone density (V) and normal white trabecular bone corresponds to normal bone density (VI).

FIG. 13 is a colorized and standardized version of the image of FIG. 12.

DETAILED DESCRIPTION OF EXEMPLARY EMBODIMENTS

The details of one or more embodiments of the presently-disclosed subject matter are set forth in this document. Modifications to embodiments described in this document, and other embodiments, will be evident to those of ordinary skill in the art after a study of the information provided in this document. The information provided in this document, and particularly the specific details of the described exemplary embodiments, is provided primarily for clearness of understanding and no unnecessary limitations are to be understood therefrom. In case of conflict, the specification of this document, including definitions, will control.

Each example is provided by way of explanation of the present disclosure and is not a limitation thereon. In fact, it will be apparent to those skilled in the art that various modifications and variations can be made to the teachings of the present disclosure without departing from the scope of the disclosure. For instance, features illustrated or described as part of one embodiment can be used with another embodiment to yield a still further embodiment.

All references to singular characteristics or limitations of the present disclosure shall include the corresponding plural characteristic(s) or limitation(s) and vice versa, unless otherwise specified or clearly implied to the contrary by the context in which the reference is made.

All combinations of method or process steps as used herein can be performed in any order, unless otherwise specified or clearly implied to the contrary by the context in which the referenced combination is made.

The methods and compositions of the present disclosure, including components thereof, can comprise, consist of, or consist essentially of the essential elements and limitations of the embodiments described herein, as well as any additional or optional components or limitations described herein or otherwise useful.

While the terms used herein are believed to be well understood by one of ordinary skill in the art, some definitions are set forth to facilitate explanation of the presently-disclosed subject matter.

Unless defined otherwise, all technical and scientific terms used herein have the same meaning as commonly understood by one of ordinary skill in the art to which the presently-disclosed subject matter belongs. Although any methods, devices, and materials similar or equivalent to those described herein can be used in the practice or testing of the presently-disclosed subject matter, representative methods, devices, and materials are now described.

Following long-standing patent law convention, the terms "a", "an", and "the" refer to "one or more" when used in this application, including the claims. Thus, for example, reference to "an imaging study" includes a plurality of such images, and so forth.

Unless otherwise indicated, all numbers expressing quantities, properties, and so forth used in the specification and claims are to be understood as being modified in all instances by the term "about". Accordingly, unless indicated to the contrary, the numerical parameters set forth in this specification and claims are approximations that can vary depending upon the desired properties sought to be obtained by the presently-disclosed subject matter.

As used herein, the term "about," when referring to a value or to an amount of mass, weight, time, volume, concentration or percentage is meant to encompass variations of in some embodiments ±50%, in some embodiments ±40%, in some embodiments ±30%, in some embodiments ±20%, in some embodiments ±10%, in some embodiments ±5%, in some embodiments ±1%, in some embodiments ±0.5%, and in some embodiments ±0.1% from the specified amount, as such variations are appropriate to perform the disclosed method.

As used herein, ranges can be expressed as from "about" one particular value, and/or to "about" another particular value. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

The terms "subject," "individual" and "patient" are used interchangeably throughout the present disclosure. In some embodiments, each of these terms refers to a vertebrate, preferably a mammal, more preferably a human.

The phrases "pixel intensity", "pixel intensity value", and "pixel value" are used interchangeably throughout the present disclosure, wherein a pixel value is a measure of the signal intensity of a voxel in an image.

The phrase "corresponds to" or "corresponding to" may be used, variously, to imply equivalence, equality, and/or values approximate to equivalence and/or equality. In some embodiments, "corresponds to" or "corresponding to" is used interchangeably with "about" and/or "that is about."

The present disclosure provides, in some embodiments, a method of colorizing a medical image. The method may comprise the steps of: (i) receiving, in an image processing unit, digital image data obtained by a digital image capture device, wherein the digital image data comprises at least one image; (ii) analyzing the digital image data with the image processing unit to identify a region of interest of an image represented by the digital image data; (iii) obtaining at least one pixel value of at least one pixel contained in the region of interest; (iv) establishing at least one color spectrum, said color spectrum comprising at least one color; (v) relating the at least one pixel value to the at least one color of the color spectrum; (vi) colorizing the at least one pixel with the related at least one color of the color spectrum; and/or (vii) producing a colorized medical image; and/or (viii) displaying the colorized medical image.

The present disclosure provides, in certain embodiments, a method of colorizing a medical image in a standardized fashion. The method may comprise the steps of: (i) receiving, in an image processing unit, digital image data obtained by a digital image capture device, wherein the digital image data comprises at least one image; (ii) analyzing the digital image data with the image processing unit to identify a region of interest of an image represented by the digital image data; (iii) obtaining at least one pixel intensity value of at least one pixel contained in the region of interest; (iv) establishing at least one color spectrum, said color spectrum comprising at least one color; (v) relating the at least one pixel value to the at least one color of the color spectrum; (vi) colorizing the at least one pixel with the related at least one color of the color spectrum; and (vii) producing a colorized medical image; and/or (viii) displaying the colorized medical image.

In some embodiments, the digital image data is processed with the image processing unit, and the processing step may comprise applying at least one of a noise reduction filter and a smoothing algorithm. Moreover, the smoothing algorithm comprises a Gaussian smoothing algorithm in certain embodiments. And in some embodiments, the color spectrum is saved in a bank and/or a data storage area.

Furthermore, in certain embodiments, the digital image data comprises at least one of a computed tomography image, a magnetic resonance image, an ultrasound image, a positron emission tomography image, a single-photon emission computed tomography image, or a fusion image of two or more digital images. Also, in some embodiments, the present disclosure provides that the image is a cross-sectional image of a portion of a body of a patient.

Additionally, the methods of the present disclosure may comprise a step of analyzing the digital image data, including determining at least one statistical measure of the digital image data. The statistical measure may be, for example, an arithmetic mean of the at least one pixel intensity value of at least one pixel in the region of interest. Also, in some embodiments, the statistical measurement may be restricted to a range of pixel intensities, not including all possible pixel intensities.

In other embodiments, the present disclosure provides a method of colorizing a medical image, comprising: (i) receiving, in an image processing unit, digital image data obtained by a digital image capture device, wherein the digital image data comprises at least one medical image; (ii) analyzing the digital image data with the image processing unit to identify a region of interest of the medical image represented by the digital image data; (iii) obtaining a first pixel value for each of at least two pixels contained in the region of interest; (iv) defining a second pixel value as the arithmetic mean of the first pixel values; (v) providing at least one color spectrum, the color spectrum comprising at least one color and relating the at least one color to at least one pixel value; (vi) selecting a color spectrum comprising at least one pixel value corresponding to the second pixel value; and (vii) colorizing the region of interest with the selected color spectrum.

And in certain embodiments, the method further includes (i) producing at least one colorized medical image; (ii) displaying the at least one colorized medical image; (iii) processing the digital image data with the image processing unit; (iv) applying at least one of a noise reduction filter and a smoothing algorithm, such as a Gaussian smoothing algorithm, to the digital image data and/or only to a region of interest; (v) providing a plurality of color spectra; and/or (vi) storing a plurality of color spectra in a bank and/or a data storage unit and/or a data storage area.

In certain embodiments, the medical image of the present disclosure is a cross-sectional image of a portion of a body of a patient, and/or the medical image may include a cross sectional image of a portion of the body. In some embodiments, the medical image comprises an image of least one of a head, a spine, a liver, a kidney and a tumor. And in some embodiments, the medical image is obtained by a digital image capture device comprising at least one of a computed tomography (CT) scanner, a magnetic resonance imaging (MRI) scanner, an ultrasound transducer, a positron emission tomography (PET) scanner, and a single photon emission computed tomography (SPECT) scanner.

In still other embodiments, the present disclosure provides a method of colorizing a medical image, comprising: (i) receiving, in an image processing unit, digital image data obtained by a digital image capture device, wherein the digital image data comprises at least one medical image; (ii) analyzing the digital image data with the image processing unit to identify a region of interest in the medical image represented by the digital image data, wherein the region of interest comprises at least one pixel; (iii) segmenting said region of interest from the digital image data to form at least a first image segment and a second image segment, wherein the first image segment comprises the region of interest; (iv) measuring at least one pixel intensity value for at least one pixel in the first image segment to obtain a at least one measurement; (v) using the at least one measurement to calculate a statistical value; (vi) providing a plurality of color spectra, wherein each color spectrum comprises at least one color and relates the at least one color to at least one color value; (vii) selecting a color spectrum from the plurality of color spectra, wherein the selected color spectrum comprises at least one color value that corresponds to the calculated statistical value; (viii) mapping the selected color spectrum to the region of interest by applying at least one color of the color spectrum to at least one pixel having a pixel intensity value corresponding to the related color value of the color spectrum; (ix) producing at least one colorized medical image; and/or (x) displaying the at least one colorized medical image.

In some embodiments, the methods of the present disclosure further comprise processing the digital image data with the image processing unit, for example by applying at least one of a noise reduction filter and a smoothing algorithm, such as a Gaussian smoothing algorithm, to a region of interest. And in certain embodiments, the calculated statistical value comprises an arithmetic mean. In certain embodiments, the measurement comprises a measured pixel intensity value. Meanwhile, in some embodiments, the color spectrum comprises at least two colors. Further, in some embodiments, the methods of the present disclosure include a step of storing the plurality of color spectra in at least one of a bank and a data storage unit. In certain embodiments, the digital image data comprises medical images of/from a plurality of patients.

In certain embodiments, a segmented region within said digital image data is used to select and/or apply a smoothing algorithm and a specific color spectrum, from a bank of pre-defined color spectra, in order to generate medical images that are color enhanced, so as to facilitate improved viewing and detection of normal and pathologic findings, as compared against the native digital grayscale medical image. In some embodiments, segmenting an image forms a plurality of image segments, such as a first image segment, a second image segment, etc. And in some embodiments, an image segment comprises the region of interest.

In some embodiments, at least one measurement, such as a statistical measurement, of the pixel intensity value(s) in a region of interest is used to select a specific color spectrum from a bank of color spectra, thereby standardizing the colorization process over a population of patients with different statistical measurements. This step solves a significant problem in the art with variability in pixel intensities on cross sectional digital medical images across a diverse population of patients. Additionally, according to the methods of the present disclosure, the choice of color(s), the overall intensity of color(s), the color opacity and/or the grayscale opacity may be selected to suit a particular clinical scenario. Indeed, color opacity can be set to any value that a user selects, between about 0% and 100%. Likewise, the grayscale opacity can be set to any value between about 0% and about 100%. And in certain embodiments, a user may provide an opacity ratio of color:grayscale in the range of about 100:1 to 1:100. In some embodiments, the opacity ratio is adjusted to improve visualization of an image.

In some embodiments, the colorization, including color spectrum selection(s), noise reduction and image smoothing are set to defaults, but a user may review the images that are colorized in the methods of the present disclosure and alter these and a number of other features. For instance, in certain embodiments, a user may increase or decrease the pixel intensities in the images by 1 HU increments until the desired colorization effect is achieved.

In certain embodiments, the percent opacity for colors may be set to 100% by default in some instances; however, the opacity can easily be adjusted by the user. Likewise, the noise reduction filter and/or the Gaussian smoothing algorithm can be selectively applied and/or removed by the user. Further, the user can manipulate the sigma value of the smoothing algorithm to alter the degree of image smoothing. Still further, in some embodiments, a user can manipulate the amount of erosion along the periphery of a region of interest in single pixel increments. Additionally, a user may alter an individual color spectrum or build an entirely new bank of customized color spectra, with new color choices and expansion or reduction in the range of pixel intensities that are colorized.

Certain embodiments of the methods of the present disclosure include a step of identifying a clinical scenario where the colorization methods of the present disclosure will improve visualization and detection of normal and/or pathologic findings on cross sectional digital medical images. In general, a suitable clinical scenario is any indication wherein (i) the variability in pixel intensity values across a population of patients and/or (ii) a subtle differences in pixel intensity values impacts the diagnosis of a pathologic condition. Examples of clinical scenarios wherein the methods of the present disclosure may be applied include but are not limited to the following: evaluation for acute stroke on nonenhanced head CT images or contrast-enhanced head CT angiogram images; screening for liver or renal tumors on ultrasound images or contrast-enhanced CT or magnetic resonance images; screening for low bone density or osteoporosis in the hip or spine or nonenhanced CT images; and/or evaluation for stroke on diffusion weighted magnetic resonance images. Moreover, the presently disclosed methods will be valuable in many additional clinical scenarios, as will be appreciated by one of skill in the art.

In some embodiments, the digital image capture apparatus may comprise a computed tomography (CT) scanner, a magnetic resonance imaging (MRI) scanner, an ultrasound transducer, a positron emission tomography (PET) scanner, a single photon emission computed tomography (SPECT) scanner, or a combination thereof (e.g. PET/CT, PET/MRI, etc.). In certain embodiments, the digital image capture apparatus comprises another imaging device capable of capturing digital medical images, as known in the art.

The digital image data comprises at least one image. In certain embodiment, the at least one image is a two-dimensional image. In certain embodiments, the digital image is a three-dimensional image. In some embodiments, the digital image data comprises at least one medical image, such as a cross sectional digital medical image. Accordingly, in certain embodiments, the digital image data comprises a plurality of digital medical images, such as cross sectional digital medical images of at least one portion of the body of a subject. The digital image data and/or a medical image of the present disclosure may comprise, in some embodiments, at least one of a computed tomography image, a magnetic resonance image, an ultrasound image, a positron emission tomography image, a single-photon emission computed tomography image, or a fusion image. And in some embodiments, the digital image comprises a medical image obtained with the use of one or more contrast agents and/or radionuclides. The most common format for cross sectional digital medical images is the Digital Imaging and Communications in Medicine (DICOM) format. In another embodiment, other image formats, including, for example, JPEG, PNG, TIFF, and the like, could be processed via the methods of the present disclosure.

Figure 1:
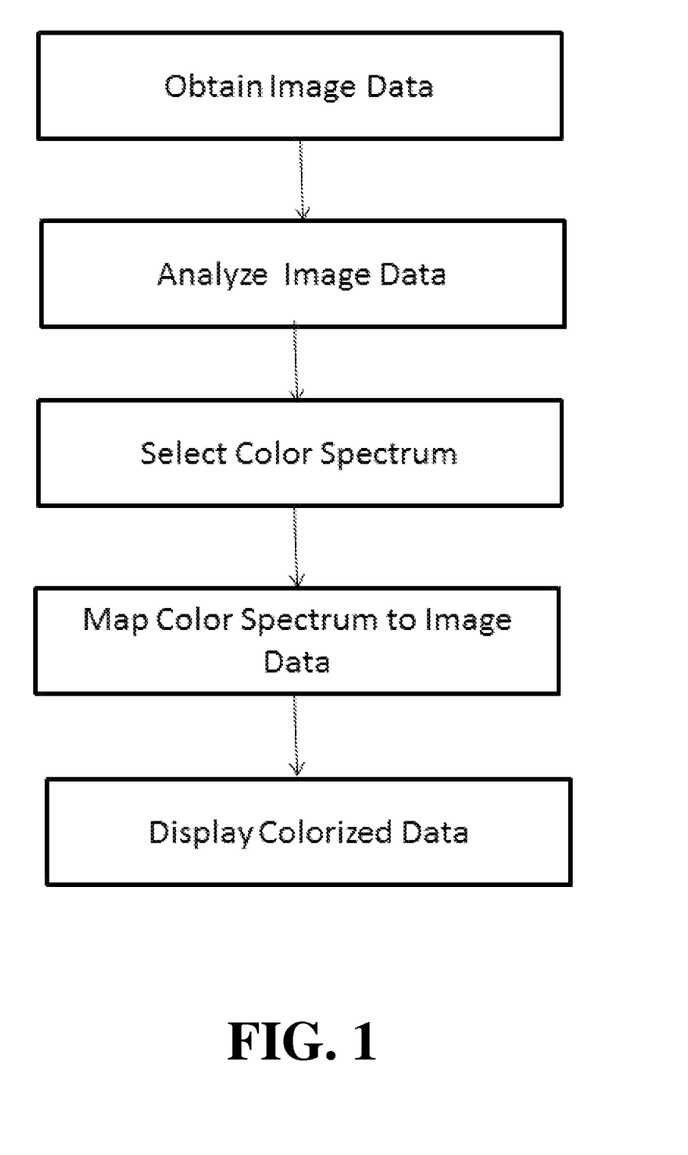
FIG. 1 is a flowchart illustrating an embodiment of a method according to the present disclosure.
Figure 2:
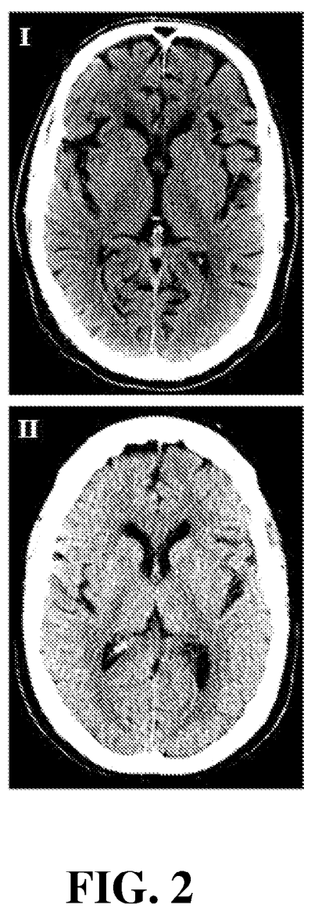
FIG. 2 shows nonenhanced CT images of the head of a first patient (I) and of the head of a second patient (II), wherein the respective patients have different mean brain attenuations. The images are shown with the same narrowed stroke window, 35 window width (WW) and 35 window length (WL), and the difference in mean brain attenuation is apparent due to different pixel intensities between the two images. Indeed, the first patient (I) has a mean brain attenuation of 30 HU, and the second patient (II) has a mean brain attenuation of 40 HU.

For example, in some embodiments, the digital image data of the present disclosure comprises at least one cross sectional digital medical image of a patient's head, as shown in FIG. 2. In some embodiments, the digital image data comprises between about 25 and about 45 cross sectional, digital computed tomography images of a patient's head. In other embodiments, the digital image data comprises CT images of the spine, liver, kidney(s), other body region(s), other organ(s), mass(es), or tumor(s).

In certain embodiments, the image processing unit comprises a computer. In some embodiments, the image processing unit comprises hardware, software and/or a combination of hardware and software. In some embodiments, software according to the present disclosure is operable offline, on a computer, on a server, on a cloud-based system and/or on a portable computing device.

In some embodiments, the image display unit comprises, for example, a computer monitor, a television, and/or another display screen, as known in the art.

In certain embodiments, the image data storage unit comprises a form of memory that is accessible via a computer. For example, in certain embodiments, the data storage unit comprises a hard drive, a removable disk, cloud-based storage, or any other memory unit known in the art.

The methods of the present disclosure may be carried out on an image processing system. In certain embodiments, the image processing system comprises at least one of a digital capture apparatus, an image processing unit, an image display unit and/or an image data storage unit.

In certain embodiments, the user may desire to apply the colorization methods to an entire image, to a set of images, or, more preferably, to a segmented region of interest, leaving other pixels in grayscale. A specific region on the images is segmented either manually or by automated methods.

A thresholding step may be used to select a region of interest. In a thresholding step, a user may select a region of interest in one or more segments of an image by identifying pixel intensities within a specified range. In some embodiments, the user may select and/or segment a region of interest manually, for example, in a free-form manner via use of a function of the image processing unit. Alternatively, the region of interest may be selected and/or segmented automatically, for example, upon instruction to and action by the image processing unit. In some embodiments, the selection and/or segmentation may be conducted on a single image; however, in certain embodiments, the selection/segmentation is conducted on multiple images concurrently. In certain embodiments, a thresholding step may be applied to the digital image data and/or to any subset thereof.

In some embodiments of the methods of the present disclosure, a mask of a region of interest is created. In certain embodiments, once the region of interest is identified, subsequent colorization steps are applied to the region of interest. In another embodiment, the colorization steps are applied to an entire image and/or to an image data set.

Moreover, a color spectrum that assigns multiple different colors to a defined range of pixel intensities within a segmented region of interest is provided in the methods of the present disclosure. In some embodiments, the colors of a selected color spectrum are mapped to an image and/or to a region of interest of a selected image. In certain embodiments, the selected color spectrum comprises only colors other than those provided in an unaltered image received from the image capture device. A user may alter the color spectrum to improve visualization of an image, as needed. In some embodiments, the color spectrum comprises a one or more colors. Furthermore, a user may select which color(s) to include in a particular color spectrum, and the user may define any or all of the darkness or lightness level, saturation level, and opacity level of the color(s) in a color spectrum.

A selected color may then be assigned to a color value. In some embodiments, a color value is a number. In other embodiments, the color value is a letter or other designator. In some embodiments, the color value comprises a pixel intensity value. For example, in some embodiments, the color value is a specific pixel intensity and/or to a specific range of pixel intensities. Additional colors may be added or removed from a given color spectrum.

In certain embodiments, if two or more colors are assigned to two or more pixel intensities, respectively, the colors may be blended to and applied to undesignated pixel intensities between them. For example, if blue is assigned to a pixel intensity of 50 and red to a pixel intensity of 100, then a pixel intensity of 75 will be a 50/50 mix of blue and red. Pixel intensities closer to 50 will have more blue color, and pixel intensities closer to 100 will have more red color. In some embodiments, pixel intensities above or below the specified range of pixel intensities are not colorized and are left in their native grayscale form.

In some clinical scenarios, only a range of pixel intensities within a segmented region will be colorized, leaving other native grayscale pixel intensities unchanged. The unchanged native grayscale pixel intensities serve as a roadmap, making it easier for the user to visualize the anatomic region of interest. In addition, limiting the colors to a segment of the image avoids distraction from other less relevant areas on the images. The choice of color is made to enhance contrast between normal and pathologic structures and to assign meaning to respective pixel intensities. For example, in certain embodiments, a CT image of fluid has an intensity of between about −20 HU and about +20 HU. Moreover, said fluid may be colored blue on CT images when a user assigns blue color to attenuation values between −20 and +20 HU in a color spectrum of the present disclosure. Similarly, acute blood and hyperdense clotted blood in an artery may be colored red on nonenhanced head CT images by assigning red color to attenuation values between 60 and 100 HU according to a method of the present disclosure.

For typical cross sectional digital medical images, the pixel intensities are displayed in grayscale, and the transition from black to white is gradual with incremental changes in pixel intensity. Conversely, in certain embodiments, the colorization method(s) of the present disclosure can be used to make an abrupt change in contrast between a narrow range of pixel intensities. In other words, a color spectrum of the methods of the pending claims can, but need not be, applied to an image in a manner that reflects an incremental and/or gradual change in adjacent pixel intensity. Furthermore, multiple contrast interfaces (i.e., multiple abrupt pixel intensity and/or color changes, within a narrow range of pixels intensities) are possible using multiple different colors, and certain colors can be set to correspond to specific normal and pathologic findings. As the user selects and/or alters the colors of a particular color spectrum, the changes are visible on an image display unit. Accordingly, a user may alter the selected color spectrum and/or assigned pixel intensities associated with each color until visualization and detection of normal and/or pathologic findings is optimized and/or improved.

Figure 3:
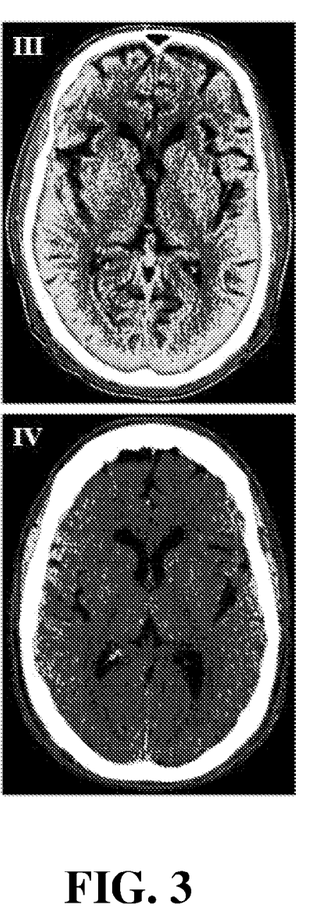
FIG. 3 presents the images of FIG. 2 as modified by a traditional color-mapping method. In accord with FIG. 2, the images in FIG. 3 are noticeably different in appearance due to the variability in mean brain attenuation of the respective patients. Notably, image noise is also more apparent in the colorized images in FIG. 3 than in the grayscale images from FIG. 2.

In some embodiments, a noise reduction filter may be applied to the digital image data and/or to any selected subset or portion thereof. Further, in certain embodiments, a smoothing algorithm is applied to the digital image data. In some embodiments, the smoothing algorithm comprises a Gaussian smoothing algorithm. In certain embodiments, the smoothing algorithm is applied to the digital image data or to any portion thereof. In certain embodiments, the smoothing algorithm is applied only to the colorized pixels. The sigma value for the Gaussian smoothing algorithm may be increased or decreased by the user, thereby increasing or decreasing the amount of smoothing, until the amount of smoothing is visually optimized in the viewer. This process reduces the image noise, which is often more apparent once the pixels are colorized. The purpose of the noise reduction filter and smoothing algorithm is to reduce image noise and further improve visualization of normal and pathologic findings on the color enhanced images. (See FIG. 2 and FIG. 3)

In some embodiments, the methods of the present disclosure include a step of receiving digital image data obtained by an image capture device in an image processing unit, wherein the digital image data comprises at least one image. The digital image data may be collected, transmitted, and/or stored. Additionally, the digital image data may be obtained by a digital image capture device and/or received in an image processing unit. In some embodiments, the digital image data may be transmitted and/or received in real time.

In some embodiments, the methods of the present disclosure include a step of analyzing the digital image data with the image processing unit to identify a region of interest of an image represented by the digital image data. And in certain embodiments, analyzing the digital image data comprises determining at least one statistical measure of the digital image data. In certain embodiments, the region of interest is identified manually, and in some embodiments, the region of interest is identified automatically by the image processing unit. The region of interest may include image data comprising, for example, images of a patient's intracranial contents, vertebral bodies, spine, femoral neck, organs (such as the liver or kidneys), tumors, masses, or other body regions or structures.

The at least one statistical measure may be an arithmetic mean of the at least one pixel value of at least one pixel contained in the region of interest. In some embodiments, the statistical measure is determined by analyzing a selected range of pixel intensities within a region of interest. The statistical measurement may be determined manually or automatically with the image processing unit.

In some embodiments, when selecting a preferred color spectrum, a user measures the pixel intensities in an organ or segmented region of interest. The measurement is most commonly an arithmetic mean pixel intensity of the organ of interest, but the statistical measurement can be a median value, variance or higher order statistical analysis. In certain embodiments, the measurement is limited to the segmented region of interest, thereby excluding other regions of the images. The measurement may be made on one or more images and include all pixels in the segmented region, but more commonly is an assessment of pixels within a limited range of pixel intensities. The purpose of performing the statistical analysis on a limited range of pixel intensities is to exclude signal from noise and from structures that are not of interest, so that the optimal color spectrum can be selected. The statistical measurement may be limited to a single image slice but is more commonly made on multiple slices, using an arithmetic mean of the measurements to derive a final value. In some embodiments, statistical measurements are rounded to the nearest integer. Further, a user has the option to limit the statistical measure to a circular region of interest that can be manually placed on the images. The size of the circular region of interest can be altered as desired by the user. This allows the user to limit the statistical measurement to an organ, tissue or area of interest. For example, the user may activate a circular region of interest with a radius of 4 cm and measure the mean pixel intensity in the liver on ultrasound, CT or magnetic resonance images of the liver. That region of interest may be propagated onto multiple contiguous slices and an arithmetic mean of the mean pixel intensity within each region of interest is taken as the final mean pixel intensity.

In certain embodiments, the methods of the present disclosure include a step of obtaining a pixel value contained in the digital image data. The step of obtaining a pixel value contained in the digital image data may include, for example, calculating a pixel value from the digital image data and/or measuring a pixel value from the digital image data.

In certain embodiments, the methods of the present disclosure include a step of producing a colorized image. In some embodiments, the colorized image is produced by replacing at least one pixel in at least one image with a corresponding colored pixel. And in some embodiments, the step of producing a colorized image comprises colorizing at least one pixel in at least one image. In certain embodiments, the at least one pixel is colorized with the at least one related color of an established color spectrum.

In some embodiments, a color spectrum is selected based on and/or related to a statistical measurement of pixel intensities in a region of interest. In certain embodiments, a color spectrum is stored by a data storage unit. And in some embodiments, the color spectrum is saved in a bank and/or data storage area. In certain embodiments, the data storage unit comprises a data storage area. Indeed, the steps of the methods of the present disclosure include a number of different options, as described, so that the user can optimize the colorization and/or noise reduction for multiple clinical indications and multiple image data sets.

Figure 5:
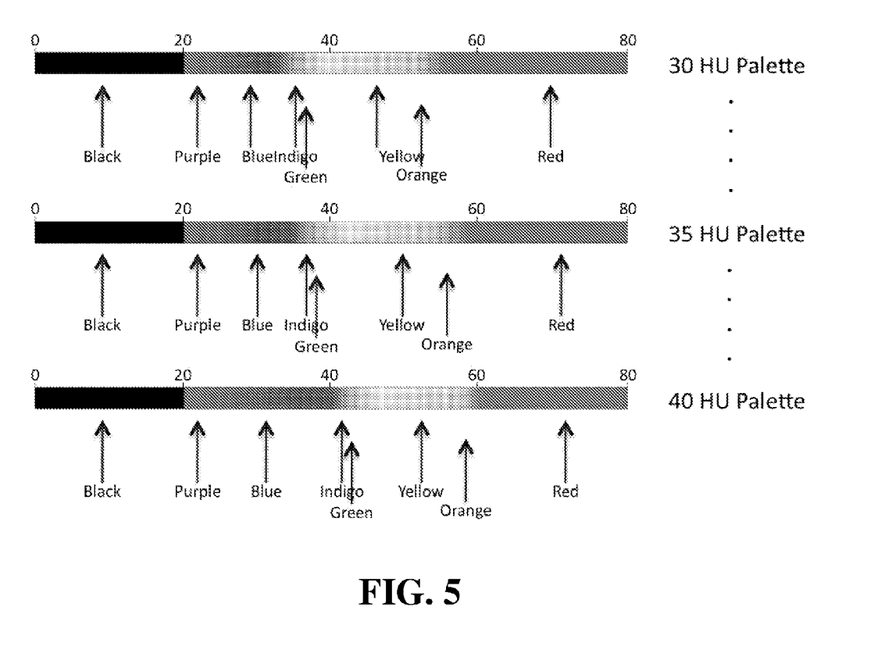
FIG. 5 illustrates examples of three different color spectra (or color palettes) designed for application to nonenhanced head CT images for assessment of acute stroke. The 30 HU spectrum (top), 35 HU spectrum (middle), and 40 HU spectrum (bottom) differ in assigning some colors to different pixel intensities between 20 and 60 HU. However, black is assigned to 0-20 HU pixels in each spectrum, to assign black color to fluid attenuation; and red is assigned to 60-80 HU pixels in each, to assign red color to acute blood or hyperdense clot within the carotid, vertebral, or cerebral arteries. The color spectra are designed to improve visualization and detection of normal and pathologic findings.
Figure 6:
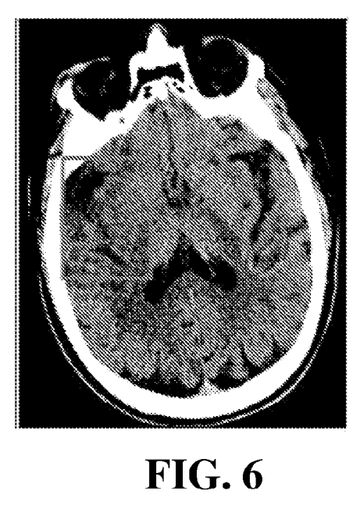
FIG. 6 is a nonenhanced CT image of a patient's head, provided in grayscale, showing slight loss of the gray-white junction in the right side of the brain (outline in a box), corresponding to findings from an acute ischemic stroke.
Figure 7:
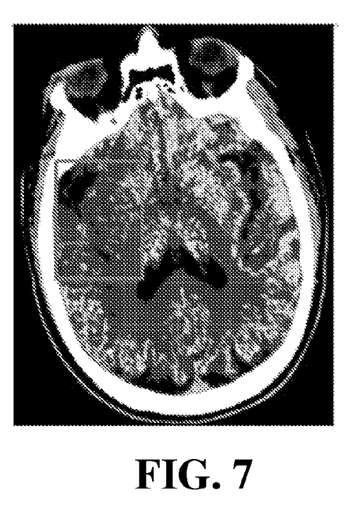
FIG. 7 is a colorized version of the image presented in FIG. 6, wherein the image of FIG. 6 has been colorized via a method according to the present disclosure. As a result, the acute ischemic stroke (outlined by a box) is easier to visualize and/or detect on the colorized image of FIG. 7 as compared to the grayscale image of FIG. 6. Moreover, the normal cortex and basal ganglia are shown in yellow, the white matter in blue, and ischemic cortex and basal ganglia in blue.
Figure 8:
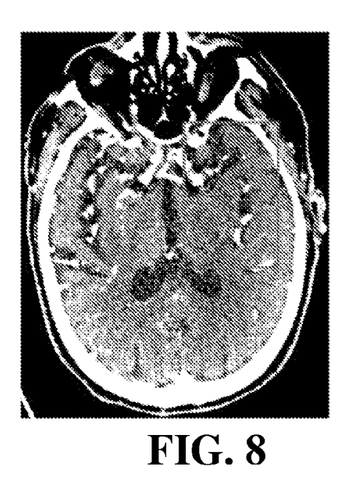
FIG. 8 shows a contrast-enhanced CT angiogram of the head in grayscale with normal brain windows.
Figure 9:
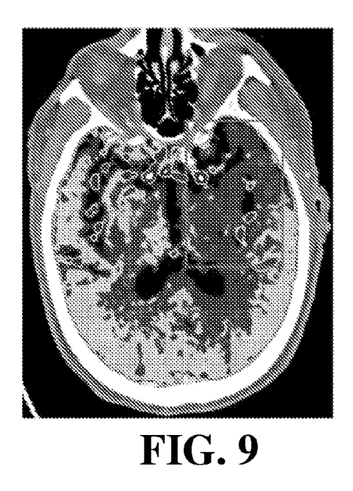
FIG. 9 is a colorized and standardized CT angiogram of the head. The left-sided acute ischemic stroke (outlined by a box) is easier to visualize and detect on the standardized and colorized image in FIG. 9. The normal enhancing cortex and basal ganglia are shown in yellow, the white matter in shown blue, and the ischemic left cortex and left basal ganglia are shown in blue. A measurement of the mean attenuation of the intracranial contents was used to select the optimal color spectrum from a bank of color spectra. The use of colors adds contrast to the images, improving viewing and detection of normal and pathologic findings.
Figure 10:
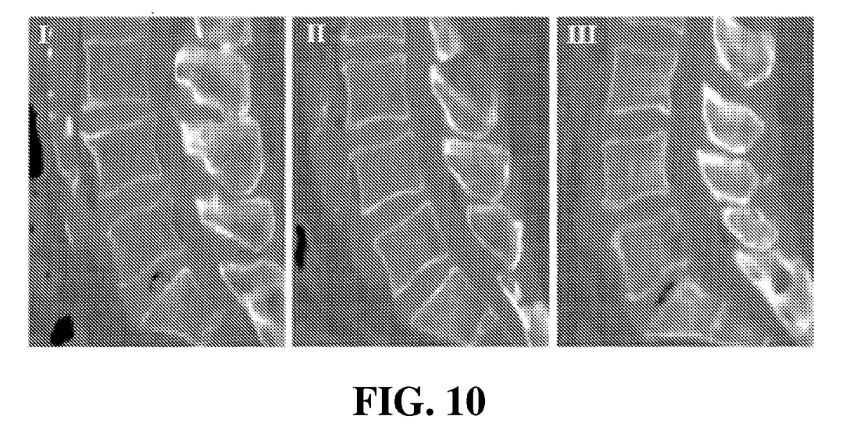
FIG. 10 provides three nonenhanced CT images of the spine from three different patients (I, II and III) in grayscale.
Figure 11:
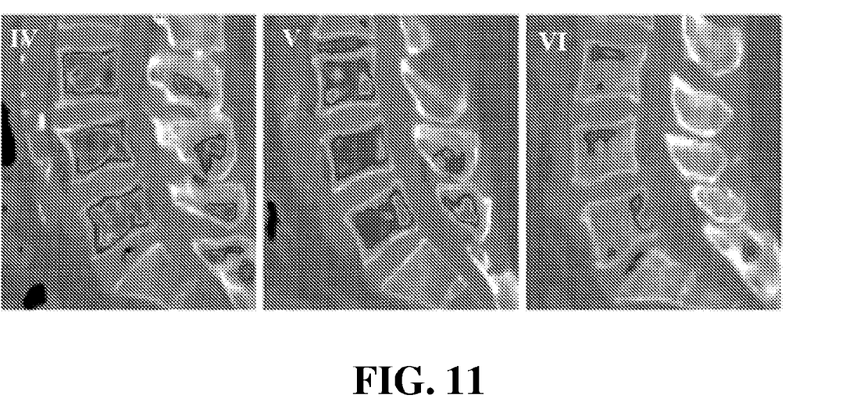
Figure 12:
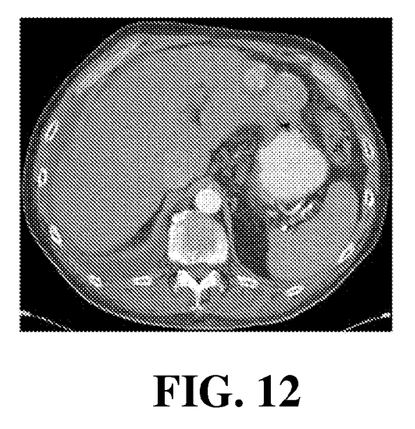
FIG. 12 is a contrast-enhanced CT image of the liver in grayscale with soft tissue windows.
Figure 13:
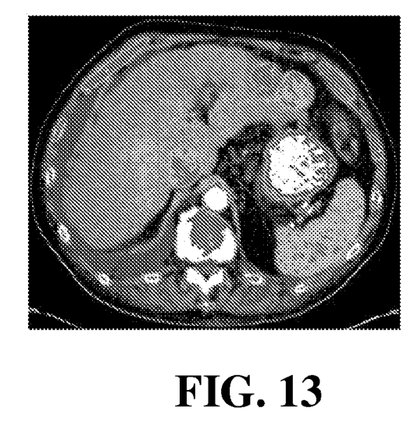
In FIG. 13, fluid (ascites) is colored blue, the normal liver is colored teal, the enhancing tumors are colored red, and fluid or cysts (not shown) are colored blue to signify fluid content. A measurement of the mean attenuation of a circular region of interest placed in the liver was used to select the optimal color spectrum from a bank of color spectra. The enhancing tumor is easier to visualize and detect on the standardized and colorized image, particularly when scrolling through a continuous stack of images. Indeed, the colorization facilitates differentiation of hyperenhancing tumors from hypoenhancing tumors, normal liver, and fluid-attenuating cysts.
Figure 14:
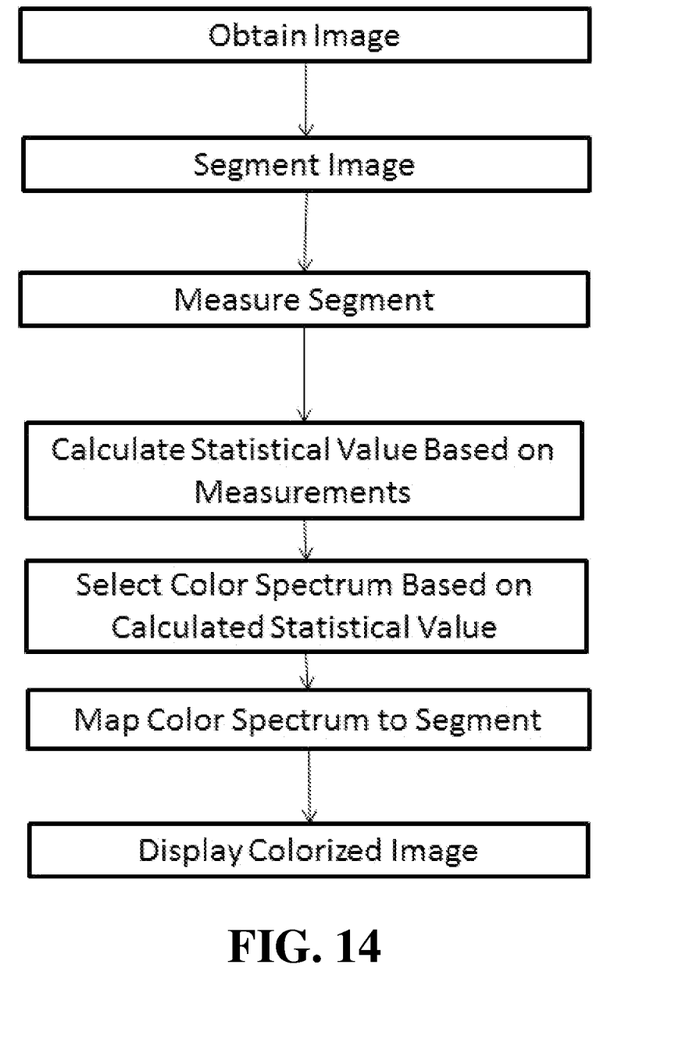
FIG. 14 is a flowchart illustrating an embodiment of a method comprising steps according to the present disclosure.

Some embodiments of the methods of the present disclosure include a step of generating a bank of color spectra using an optimized/selected color spectrum as a reference. For all possible statistical measurements of the pixel intensities in a segmented region of interest (which may be rounded to the nearest integer), a unique color spectrum may be generated and assigned according to a given statistical measurement value. In certain embodiments, each color spectrum in a bank of color spectra is designed to fit one statistical measurement in the segmented region of interest. For each new color spectrum that is generated, the pixel values assigned to colors in the selected color spectrum are adjusted upward or downward in proportion to a statistical measurement, though not all colors need to be shifted (see FIG. 5).

For example, the optimized color spectrum to be applied to the intracranial contents from a nonenhanced head CT could be designed for intracranial contents that have a mean attenuation of pixels between 20 and 50 HU (the statistical measurement) equal to 30 HU. In particular embodiments, pixel intensities between 0 and 20 HU are assigned a black color in the color spectra in a bank in order to keep water attenuation (cerebrospinal fluid) black. In some embodiments, the pixel intensities between 20 and 60 HU are shifted upward or downward in proportion to all possible statistical measurements (e.g., mean attenuation values). For example, the green-yellow interface may be at 38 HU in the optimized color spectrum (named "30" because it is to be used for intracranial contents with a mean attenuation of 30 HU), but the green-yellow interface is located at a higher attenuation value for intracranial contents that measure 40 HU (see FIG. 5). In certain embodiments, the degree of movement of colors upward or downward from a selected color spectrum is proportional to the statistical measurement but need not be moved upward or downward in absolute values that match the statistical measurement.

Figure 4:
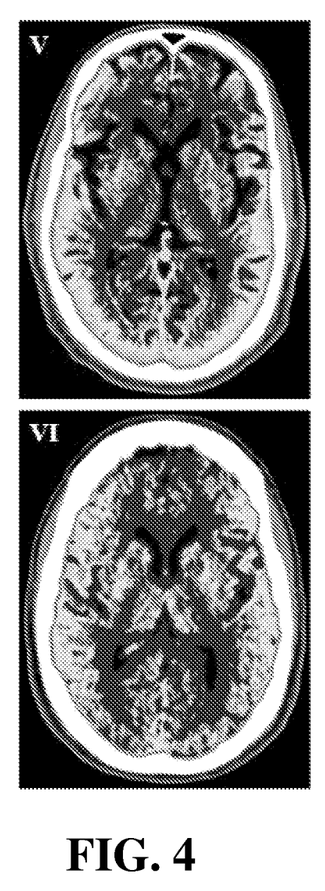
FIG. 4 presents the images of FIG. 2 as modified by a colorizing method according to the present disclosure. Specifically, the images in FIG. 4 have been colorized to improve contrast and visualization of normal anatomic and pathologic structures. A measurement of the mean attenuation of the intracranial contents was used to select the optimal color spectrum from a bank of color spectra. Notably, the colorized images are similarly colored, despite differences in mean brain attenuation. Also, the noise has been significantly reduced, and only the intracranial contents are colorized, with the periphery of the intracranial contents partially eroded to remove areas of partial volume averaging between the brain and skull.

Color spectra may be further optimized and/or refined so that the statistical measure(s) of the pixel intensities in a region of interest correspond to a color spectrum that has a similar look on a new image data set. In some embodiments, a standardized color spectrum is applied to any image data set, despite variability in pixel intensities across a population of patients and despite different statistical measures of the region(s) of interest (See FIG. 4).

For example, if the intracranial contents from a nonenhanced head CT study is the region of interest, the intracranial contents will be segmented, a mean attenuation (statistical measure) will be made, and the corresponding color spectrum will be provided. A brain with a mean attenuation value of 30 HU would result in the color spectrum named 30 being provided/applied. A brain with a mean attenuation value of 40 HU would result in the color spectrum named 40 being applied. Both cases would have a similar appearance where water attenuation (cerebrospinal fluid) would be black and where the cortex (gray matter) and white matter would have a standardized or similar appearance (see, for example, FIG. 4). Similarly, pathologic findings would have a similar appearance, despite variability in the pixel intensities between the two image data sets.

Once a new bank of color spectra is optimized for a particular clinical scenario and cross sectional digital medical image data set; it can be used to generate standardized and colorized images for additional cases/patients. A user may perform a statistical measure (e.g. mean intensity value) of an area of interest either manually or automatically. The value from the statistical measurement may be used to automatically load a corresponding optimized color spectrum from a bank of color spectra. The colors may be mapped (i.e. applied) to the segmented region of interest, and the noise reduction filter and smoothing algorithm (with optimized sigma value) may be automatically applied to the colorized pixels. The user may view the final product on a viewer and/or display. If the colorization process is not satisfactory, the user may adjust the pixel intensities in the image upward or downward, for example by 1-unit increments, until the desired colorization is achieved. In fact, upward and downward adjustments of the pixel intensities are another way to standardize the variability in pixel intensities across a patient population.

The final colorized images may, in some embodiments, be viewed with software but can also be exported as a stack of images. In an embodiment, the final colorized images may be exported in DICOM format. The exported images can be uploaded to a picture archiving and communications system (PACS) for viewing, interpretation, and storage. In certain embodiments, the entire standardization and colorization process of the present disclosure may be fully automated and run on the image scanner computer platform or run offline on a computer, server, cloud-based system or portable computing device. The final colorized images may be integrated with the PACS. Moreover, in some embodiments, the colorized images may be interpreted in parallel, in side-by-side fashion, with the native grayscale images.

The methods of the present disclosure are useful, for example, for colorizing, displaying and/or visualizing nonenhanced CT images of the head to evaluate for hemorrhagic or ischemic stroke. As such, the methods of the present disclosure can facilitate the improved viewing and detection of, for example, ischemic stroke findings, which are otherwise difficult to identify on routine grayscale images.

In certain embodiments, the methods of the present disclosure are useful, for example, for colorizing, displaying and/or visualizing contrast-enhanced CT angiography images of the head to evaluate for ischemic stroke findings. As such, the methods of the present disclosure can facilitate the improved viewing and detection of, for example, ischemic stroke findings, which are otherwise difficult to identify on routine (source) thin-slice CT angiography images of the head.

In some embodiments, the methods of the present disclosure are useful, for example, for colorizing, displaying and/or visualizing CT images of the spine to evaluate spinal bone density. In some embodiments, the trabecular bone can be automatically segmented using the surrounding cortical bone as a landmark to generate a mask. A statistical measure of the image pixel value(s) in the trabecular bone of the vertebral bodies is used to determine and apply at least one of a noise reduction filter, a smoothing algorithm and a specific color spectrum to the image data. As such, the methods of the present disclosure can facilitate the improved viewing and detection of, for example, normal bone density and/or low bone density or osteoporosis, particularly as compared to grayscale medical images.

In certain embodiments, the methods of the present disclosure are useful for improving visualization of CT images of the femoral neck to evaluate femoral neck bone density. In some embodiments, a statistical measure of the image pixel value(s) in the cortex and trabecular bone of the femoral neck is used to determine and apply at least one of a noise reduction filter, a smoothing algorithm and a specific color spectrum to the image data. Indeed, in some embodiments, images of a femoral neck are colorized, so as to facilitate improved viewing and detection of normal bone density and/or low bone density or osteoporosis, particularly as compared to grayscale medical images.

Further, in some embodiments, the methods of the present disclosure are useful, for example, in colorizing and displaying computed tomography or magnetic resonance images of the liver. In some embodiments, a statistical measure of the liver pixel intensity in a manually-placed circular region of interest is used to determine and apply at least one of a noise reduction filter, a smoothing algorithm, and a specific color spectrum to the image data. The use of the statistical measure and corresponding color spectrum effectively standardizes the colorization and image processing throughout a population of patients with digital image data sets that have high variability in liver pixel intensities due to the presence of intravenous contrast. Accordingly, the methods of the present disclosure provide for improved viewing and detection of normal livers and/or livers with steatosis, tumors, masses, or vascular abnormalities.

EXAMPLES

The presently-disclosed subject matter is further illustrated by the following specific but non-limiting examples.

Example 1

A method for colorizing medical images was developed and tested for improved visualization and detection of acute stroke on nonenhanced head CT images. The method was implemented on an image processing system comprising a computer.

Thirty-five nonenhanced CT images of a patient's head were captured in DICOM format. A user analyzed the images with the image processing unit to identify a region of interest suspected to include indicia of stroke-related damage. Accordingly, the image processing unit was used to identify images of structures within the boney calvarium, which is a continuous ring (or near contiguous ring) of bone with attenuation values ≥200 HU, thereby effectively segmenting the brain and intracranial contents.

A mask of the brain and intracranial contents (collectively the intracranial contents) was created. In order to reduce partial volume effects between the inner table of the skull and adjacent structures (e.g. cerebrospinal fluid), the voxels in the segmented region of interest adjacent to the inner table of the skull were eroded by a distance of 2 pixels.

Within the region of interest, the intracranial contents on the slices extending 50 mm to 75 mm below the apex of the intracranial contents were statistically evaluated using an arithmetic mean attenuation of pixel intensities between 20 HU and 50 HU. Attenuation values below and above this threshold were ignored, as they included structures such as air, fat, fluid, blood, calcification, metal, foreign bodies and/or image artifacts.

An arithmetic mean of the statistically evaluated intracranial contents was computed and used to select a specific color spectrum. In practice, the mean attenuation of the intracranial contents is expected to be between 30-40 HU, though a broader range of corresponding color spectra is available. For each final mean brain attenuation value, a dedicated color spectrum is available to standardize the presentation of colors across a patient population with variable pixel intensity of the intracranial contents. Despite variations in mean brain attenuation values between different patients, the above techniques allows the gray matter to maintain a particular color and the white matter to maintain a different color in all patients. It is understood that different color spectra may be selected, as desired by the user. The choice of colors is made to improve visualization and detection of attenuation changes in the cortex and central nuclei of the brain, or more broadly, to improve visualization and detection of normal findings and ischemic and hemorrhagic stroke findings.

Each selected color spectrum was selected according to the mean intensity value found by the statistical analysis of the intracranial contents (e.g. 25 through 45) and saved in a data storage area of the computer to create a bank of color spectra. The bank of color spectra includes multiple unique color spectra. Each color spectra relates various colors to a range of pixel values within the intracranial contents. In this example, only the intracranial contents with attenuation values between 0 and 100 HU were colorized. Pixel intensities <0 HU and >100 HU were not assigned a new color, and, accordingly, were left unaltered in their native grayscale state.

The same specific color spectrum was applied to each slice of the nonenhanced CT images, but only to the intracranial contents. The image mask of the intracranial contents was used to restrict application of color to these regions.

In this example, a selected color spectrum assigned black color to pixels with attenuation values between 0 and 20 HU, to allow for consistent and easy visualization and detection of cerebrospinal fluid. Also, the pixels with attenuation values between 60 and 100 HU were assigned red color to demark acute blood (e.g. intracranial hemorrhage) or hyperdense arteries containing acute clotted blood. While the color spectra for pixels with attenuation values between 21 and 59 HU included purple, blue, indigo, green, yellow, and red with blending at each interface, the specific attenuation values for these colors differed in each color spectrum. Consequently, the colorization process can be standardized across a population of patients with different mean attenuation values. Accordingly, the colorization of head CT studies with mean attenuation measurements of 30 HU for the intracranial contents have a similar look to brains with mean attenuation of 40 HU for the intracranial contents. See FIG. 4 and FIG. 5.

The color spectrum corresponding to the mean attenuation of the intracranial contents was applied/mapped to the intracranial contents. For stroke, the default color opacity was set to 100% color for all pixel intensities in each color spectrum. A noise reduction filter and Gaussian smoothing filter with a 1.5 sigma value were applied to the colored pixels in the intracranial contents on all images. In order to reduce volume averaging at the junction of the skull (higher attenuation) and intracranial contents (lower attenuation), the pixels at the periphery of the intracranial contents were eroded by 2 pixel lengths. This essentially removed red-colored pixels from the periphery of the intracranial contents to avoid distraction of the user.

The final colorized images had noise reduction and image pixel smoothing limited to the colored pixels, with colorization limited to the intracranial contents. The final images were displayed and viewed on a computer. Further, the final images were exported in DICOM format for viewing in parallel with the grayscale images on a DICOM viewer and for uploading and viewing on PACS. Notably, no windowing of the images was needed, as the images were optimized for the individual patient.

In testing with nonenhanced head CT images from patients that were evaluated for acute stroke (N=100 unique patients with N=3087 unique head CT images), the average processing time using a personal computer was <4 seconds for each head CT study. The mean attenuation of the intracranial contents (N=100) ranged from 30 HU to 40 HU.

Example 2

A set of head CT images (N=10) with large vessel ischemic strokes that were initially missed or difficult to identify in clinical practice by one or more expert neuroradiologists and stroke imagers was processed using the methods described herein, and the colorized images were evaluated by 3 experienced stroke imagers. All three evaluators agreed that the large vessel ischemic strokes were easier to visualize and detect in all cases (10/10 cases), including those with motion artifact and beam hardening artifact. Additional cases were tested, including head CT images with acute hemorrhage, and the colorized images had improved visualization and detection of stroke findings in each case.

It will be apparent to those skilled in the art that various modifications and variations can be made in the present invention without departing from the scope or spirit of the invention. Other aspects of the invention will be apparent to those skilled in the art from consideration of the specification and practice of the invention disclosed herein. It is intended that the specification and examples be considered as exemplary only, with a true scope and spirit of the invention being indicated by the following claims.

It will be understood that various details of the presently disclosed subject matter can be changed without departing from the scope of the subject matter disclosed herein. Furthermore, the foregoing description is for the purpose of illustration only, and not for the purpose of limitation.

What is claimed is:

1. A method of colorizing a medical image, comprising:
   receiving, in an image processor, digital image data obtained by a digital image capture device, wherein the digital image data comprises at least one medical image;
   analyzing the digital image data with the image processor to identify a region of interest in the medical image represented by the digital image data, wherein the region of interest comprises at least one pixel;
   segmenting said region of interest from the digital image data to form at least a first image segment and a second image segment, wherein the first image segment comprises the region of interest;
   measuring at least one pixel intensity value for at least one pixel in the first image segment to obtain at least one measurement value;
   using the at least one measurement to calculate at least one statistical value;
   providing a plurality of color spectra, wherein each color spectrum comprises at least one color and relates the at least one color to at least one color value;
   selecting a color spectrum from the plurality of color spectra, wherein the selected color spectrum comprises at least one color value that corresponds to the calculated statistical value;
   mapping the selected color spectrum to the region of interest by applying at least one color of the color spectrum to at least one pixel having a pixel intensity value that corresponds to the related color value of the color spectrum; and
   colorizing the region of interest with the selected color spectrum.

2. The method of claim 1, further comprising producing at least one colorized medical image.

3. The method of claim 2, further comprising displaying the at least one colorized medical image.

4. The method of claim 1, further comprising processing the digital image data with the image processor.

5. The method of claim 4, wherein processing the digital image data comprises applying at least one of a noise reduction filter and a smoothing algorithm.

6. The method of claim 5, wherein the smoothing algorithm is a Gaussian smoothing algorithm.

7. The method of claim 4, wherein at least one of the noise reduction filter and the smoothing algorithm is applied only to the region of interest.

8. The method of claim 1, wherein the calculated statistical value is an arithmetic mean.

9. The method of claim 1, wherein the color spectrum comprises at least two colors.

10. The method of claim 1, further comprising storing the plurality of color spectra in at least one of a bank and an image database.

11. The method of claim 1, wherein the digital image data comprises medical images of a plurality of patients.

12. The method of claim 1, wherein the medical image is a cross-sectional image of a portion of a body of a patient.

13. The method of claim 1, wherein the medical image comprises an image of at least one of a head, a neck, a chest, an abdomen, a pelvis, a spine, an organ, a vascular structure, a mass, a bone, and a tumor.

14. The method of claim 1, wherein the digital image capture device comprises at least one of a computed tomography (CT) scanner, a magnetic resonance imaging (MRI) scanner, an ultrasound transducer, a positron emission tomography (PET) scanner, and a single photon emission computed tomography (SPECT) scanner.

15. The method of claim 1, further comprising providing a plurality of color spectra.

16. The method of claim 15, further comprising storing the plurality of color spectra in a database.

17. A method of colorizing a medical image, comprising:
   receiving, in an image processor, digital image data obtained by a digital image capture device, wherein the digital image data comprises at least one medical image;
   analyzing the digital image data with the image processor to identify a region of interest of the medical image represented by the digital image data;
   obtaining a first pixel value for each of at least two pixels contained in the region of interest;
   defining a second pixel value as the arithmetic mean of the first pixel values;
   providing at least one color spectrum, the color spectrum comprising at least one color and relating the at least one color to at least one pixel value;
   selecting a color spectrum comprising at least one pixel value corresponding to the second pixel value; and
   colorizing the region of interest with the selected color spectrum.

18. The method of claim 17, further comprising displaying the at least one image comprising the colorized region of interest.

19. The method of claim 17, further comprising processing the digital image data with the image processor.

20. The method of claim 19, wherein processing the digital image data comprises applying at least one of a noise reduction filter and a smoothing algorithm.

* * * * *